April 29, 1947. J. C. KREJCI 2,419,565
CARBON BLACK PROCESS AND APPARATUS
Filed Dec. 14, 1942
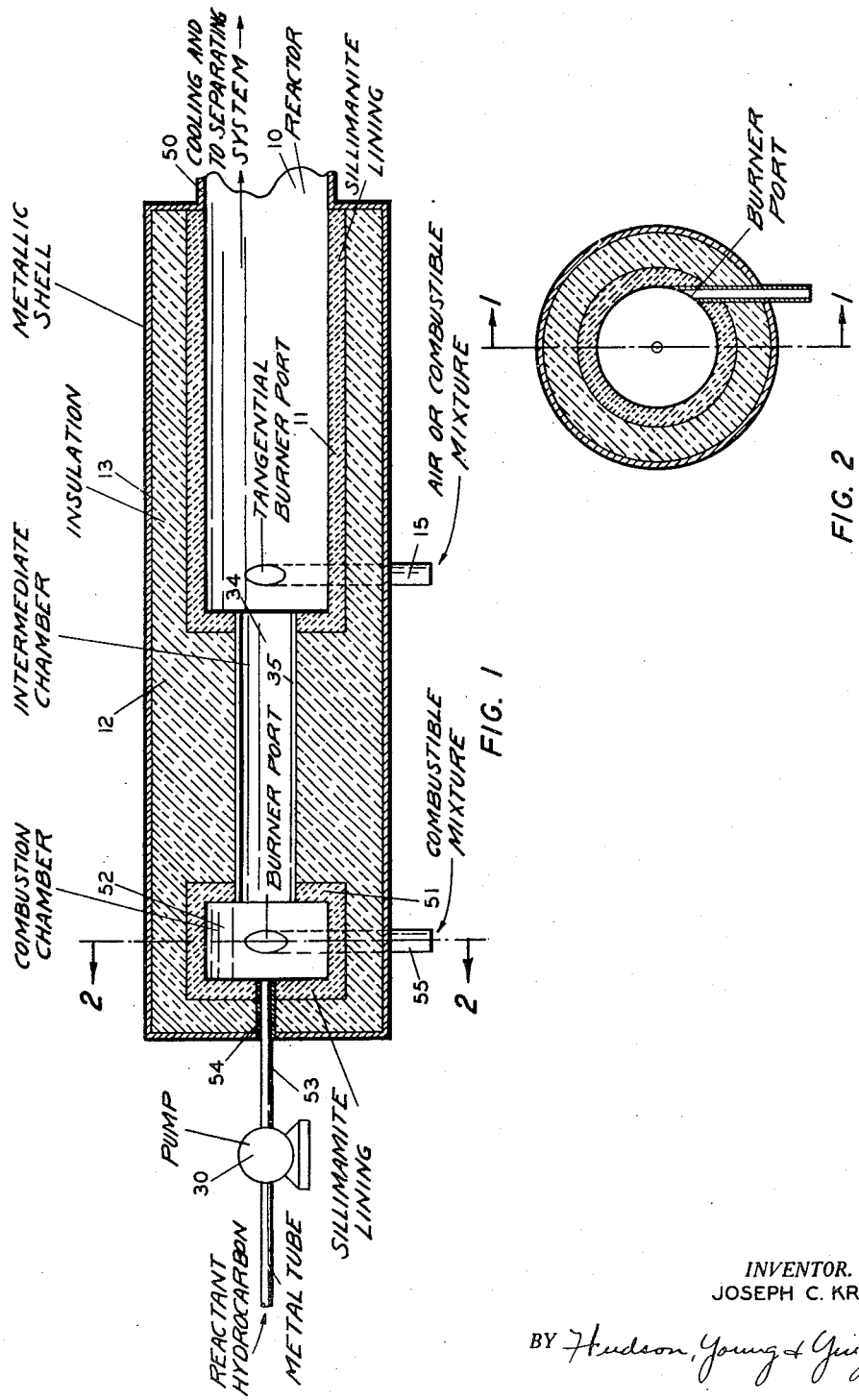
INVENTOR.
JOSEPH C. KREJCI
BY Hudson, Young & Ginger
ATTORNEYS Patented Apr. 29, 1947

2,419,565

UNITED STATES PATENT OFFICE 2,419,565

CARBON BLACK PROCESS AND APPARATUS

Joseph C. Krejci, Kaw, Okla., assignor to Phillips Petroleum Company, a corporation of Delaware Application December 14, 1942, Serial No. 469,016

14 Claims. (Cl. 23—209.8)

This invention relates to a process and apparatus for producing carbon black, and more particularly it relates to an improved method of producing carbon black by incomplete combustion of carbonaceous gases or vapors or by decomposition thereof by contact with hot gases, and is a continuation-in-part of my copending applications, Serial No. 431,171, filed February 16, 1942, and Serial No. 436,524, filed March 27, 1942.

This invention comprises improvements in the process and apparatus disclosed in the aforementioned copending applications. In one embodiment, it comprises a short cylindrical combustion chamber of large diameter into which air and gas are introduced tangentially and burn while undergoing an inward spiral flow, an intermediate chamber in which the gas from the combustion chamber flows helically along the periphery and causes heating and cracking and/or vaporization of a reactant hydrocarbon which flows axially, and the main conversion chamber in which the hydrocarbon reacts to carbon black. The longitudinal axes of the three chambers are in line, and the hydrocarbon to be converted into carbon black is directed into the system in line with the axes.

An object of this invention is to improve on the process and apparatus disclosed in my aforementioned copending applications by eliminating the preheat furnace in some of its embodiments.

Another object of this invention is to eliminate the normally large preheating furnace which requires relatively large quantities of materials of construction and in its place substitute a relatively small direct heat exchange preheater which may be constructed as an integral part of my improved carbon black making apparatus.

One specific object of this invention is to minimize contact of the reactant hydrocarbon undergoing preheating and precracking and/or vaporization with the wall of the intermediate chamber by directing the preheat gas from the combustion chamber helically along the periphery of the intermediate chamber so that it forms a protective blanket on its wall.

Still other objects and advantages will be apparent to those skilled in the art from the following description and disclosure:

In the accompanying drawing, which is a part of this specification and which illustrates a preferred form of the apparatus for carrying out my invention, Figure 1 is a longitudinal section of a preferred form of the apparatus taken along line 1—1 of Figure 2.

Figure 2 is a cross-section of the preferred form of the apparatus along line 2—2 of Figure 1.

Referring to the drawing, cylindrical reaction chamber 10 has lining 11 of a highly refractory material such as sillimanite or Alundum. This chamber 10 is equipped with one or more tangential burners 15 extending through its side wall. Air or a mixture of fuel gas and air passes through these burners and enters the chamber tangentially with respect to the inside cylindrical wall of the chamber and essentially at right angles or normal to the longitudinal axis thereof. The outlet end of the chamber 10 is open and products of the reaction exit through this open end and enter pipe 50 which carries them to the cooling and carbon collecting system, not shown. The operation of chamber 10 is the same as disclosed in the aforementioned copending applications.

Cylindrical intermediate chamber 34 and cylindrical combustion chamber 52 have refractory linings 35 and 51, respectively. The inlet and outlet ends of the intermediate chamber open into the combustion chamber and the reaction chamber, respectively. The combustion chamber has one or more tangential burners 55 through which a mixture of air and fuel gas enters the chamber. The mixture burns in the combustion chamber while flowing spirally towards its center. The hydrocarbon to be converted into carbon black is directed by tube 53, which is centered in refractory tube 54, through the center of the combustion chamber and into the intermediate chamber. Tube 53 preferably is a removable metal tube. In the intermediate chamber the reactant hydrocarbon flows axially and the hot gases generated in the combustion chamber flow helically next to the wall. This helical flow helps to keep the reactant hydrocarbon out of contact with the wall while it undergoes heating and vaporization and/or cracking.

The space between linings 51, 35, and 11 and steel shell 13 is filled by insulation 12.

When the reactant hydrocarbon is a liquid, it can be pumped through pipe 53 by pump 30. Preferably, at the end of pipe 53 the stream of oil is broken up into a spray by any suitable means such as by restricting the end of pipe 53. It is advantageous to do this as applicant has found from experience that if the liquid leaves pipe 53 as an unbroken or compact liquid stream it may, in case the apparatus is in a horizontal position, drop to the bottom of the intermediate chamber before it is vaporized completely and cause a deposit of carbon thereon.

The combustion chamber is relatively short to make it easier to direct the reactant hydrocarbon through the combustion chamber and into the intermediate chamber without hitting the forward end wall of the combustion chamber. The said chamber is relatively large in diameter to provide space for combustion. Lining 51 of this chamber must be of a very highly refractory material such as sillimanite because the combustion rate is very high and high temperatures are reached. In several experiments the temperature in the chamber was above 3000° F. when a mixture of the theoretical composition for complete combustion of air and residue gas was used in burner 55.

Since chamber 34 serves as the inlet tube to chamber 10, this function must be considered in selecting the diameter of this chamber. In several cases, a suitable diameter was found to be one which gave the gases in the chamber a linear velocity of the same order of magnitude as the linear downstream velocity of the gases in chamber 10.

Table I shows operating data taken during the manufacture of carbon black from a degraded gas oil of 18.0 A. P. I. gravity. The residue gas used had a carbon content of 35 pounds per 1000 cubic feet. All residue gas and air used were at atmospheric temperature. All the experiments reported were made with a reaction chamber 9.5 inches in diameter and 46 inches in length with three tangential burners, 1, 6, and 11 inches from the inlet end of the chamber. The first and third burners from the inlet end of the chamber were 180° apart from the second burner. The first two burners were 1.5 inches in diameter, and the third one was 1 inch in diameter. The mixture of residue gas and air (fifth and sixth columns, Table I) was so distributed among the three burners as to give the mixture the same linear velocity in all three. The intermediate chamber was 3 inches in diameter and 18 inches in length. The combustion chamber was 3 inches in length and 15 inches in diameter. It had a tangential burner 1 inch in diameter through which the fuel mixture recorded in the third and fourth columns of Table I was passed. The reactant hydrocarbon oil in the liquid state at room temperature was pumped through a tube (53 in drawing) $5/64$ inch in diameter. The end of this tube was constricted to less than $1/32$ inch so as to break up the oil stream into a spray. The oil rate is recorded in the second column of Table I. The products were cooled to about 1200° F. in an atmospheric cooling pipe and then further cooled to 300°–400° F. by a spray of water before the carbon black was collected in a bag filter. The yield in the seventh column of Table I is based on the assumption that all the carbon black was made from the oil and none from the residue gas.

The pressure on the reactant hydrocarbon oil in tube 53 need not be high, and preferably is only sufficient to overcome the resistance to flow of the $1/32$ inch constriction in the said tube 53 in order to break up the reactant oil into droplets sufficiently small that they will be vaporized by the direct heat in the combustion chamber 52 and in the intermediate preheating chamber 34. I do not use pressures sufficiently high to cause atomization of the reactant hydrocarbon liquid since this is unnecessary, but do use pressure enough to prevent the oil from entering in the form of a solid stream or drops of normal size. In this latter case carbon deposits build up at points where the oil stream or drops might come in contact with the heated furnace walls. Pressures of 100 to 150 pounds per square inch I have found to be quite satisfactory for breaking up degraded gas oils of 18° A. P. I. gravity.

*Table I*

| Run No. | Gas Oil Rate, gal./hr. | Fuel to combustion chamber, cu. ft./hr. | | Fuel to Reaction Chamber, cu. ft./hr. | | Yield, lb./gal. |
|---|---|---|---|---|---|---|
| | | Residue Gas | Air | Residue Gas | Air | |
| B490 | 18.0 | 240 | 2,400 | 1,200 | 12,000 | 5.22 |
| B489 | 17.6 | 240 | 2,400 | 1,000 | 10,000 | 5.04 |
| B491 | 16.8 | 240 | 2,400 | 800 | 10,000 | 4.64 |
| B492 | 16.7 | 240 | 2,400 | 600 | 10,000 | 4.32 |
| B493 | 17.6 | 240 | 2,400 | 400 | 10,000 | 4.19 |
| B494 | 18.0 | 240 | 2,400 | 200 | 10,000 | 3.22 |
| B495 | 18.5 | 240 | 2,400 | 0 | 10,000 | 3.25 |

In all the runs of Table I the amount of gas-air mixture used in burners 15 was sufficient to keep the wall of chamber 10 free of carbon except in run B489 in which a thin deposit formed on the wall in the last half of the chamber. No carbon deposited inside the intermediate chamber or the combustion chamber. Excellent carbon black yields were obtained from the gas oil. A yield of four pounds per gallon represents a yield of about 50 per cent based on the weight of the oil. In the series of runs, B489 and B491 through B495, decreasing the amount of residue gas used in the tangential burners of chamber 10 decreased the yield and lessened the tendency for carbon to deposit in chamber 10.

Rubber tests on the samples are recorded in Table II. For comparison, tests on commercial channel black and Gastex black are included in the table. All tests, as fully described in the aforesaid copending applications, were made with a synthetic ruber of the Buna S type (Hycar TT). A study of the table reveals that the blacks produced by the method herein disclosed are of excellent quality. The abrasion resistance is only slightly lower than that of channel black, and much greater than that of Gastex. The modulus values are higher than those of either of the commercial blacks, and the tensile values are between those of Gastex and channel black. One of the outstanding characteristics of applicant's black is its high resilience and low heat build up. This is unusual because high modulus is usually accompanied by low resilience and high heat build up.

Table II

| Sample | Vulcanization at 296° F., minutes | 300% Modulus, lb./sq. in. | Tensile at Break, lb./sq. in. | Elongation at Break, per cent | Resilience,[1] per cent | Heat Build up,[2] °C. | Abrasion Loss,[3] gms. | Shore Durometer Hardness |
|---|---|---|---|---|---|---|---|---|
| B490 | 30 | 1,895 | 2,400 | 370 | 67.2 | 85.1 | 6.21 | 65 |
| Do | 45 | 2,125 | 2,460 | 337 | | | | |
| Do | 60 | 2,200 | 2,465 | 330 | | | | |
| Do | 90 | 2,390 | 2,600 | 322 | | | | |
| B489 | 30 | 1,510 | 2,350 | 460 | 68.7 | 83.1 | 7.62 | 65 |
| Do | 45 | 1,815 | 2,500 | 430 | | | | |
| Do | 60 | 1,975 | 2,360 | 377 | | | | |
| Do | 90 | 2,050 | 2,500 | 352 | | | | |
| B491 | 30 | 1,950 | 2,485 | 370 | 67.8 | 83.8 | 5.31 | 65 |
| Do | 45 | 2,200 | 2,410 | 325 | | | | |
| Do | 60 | 2,300 | 2,490 | 325 | | | | |
| Do | 90 | 2,465 | 2,590 | 317 | | | | |
| B492 | 30 | 2,045 | 2,480 | 360 | 68.0 | 82.8 | 4.86 | 65 |
| Do | 45 | 2,210 | 2,510 | 342 | | | | |
| Do | 60 | 2,365 | 2,530 | 322 | | | | |
| Do | 90 | 2,525 | 2,525 | 300 | | | | |
| B493 | 30 | 1,975 | 2,515 | 390 | 67.5 | 83.2 | 5.13 | 65 |
| Do | 45 | 2,170 | 2,475 | 340 | | | | |
| Do | 60 | 2,385 | 2,565 | 327 | | | | |
| Do | 90 | 2,435 | 2,550 | 315 | | | | |
| B494 | 30 | 1,815 | 2,400 | 380 | 67.4 | 85.0 | 4.98 | 65 |
| Do | 45 | 2,125 | 2,400 | 337 | | | | |
| Do | 60 | | 2,210 | 290 | | | | |
| Do | 90 | | 2,390 | 290 | | | | |
| B495 | 30 | 1,800 | 2,350 | 410 | 67.1 | 86.0 | 5.34 | 66 |
| Do | 45 | 2,085 | 2,365 | 350 | | | | |
| Do | 60 | 2,200 | 2,440 | 330 | | | | |
| Do | 90 | 2,390 | 2,465 | 307 | | | | |
| Channel Black | 30 | 1,010 | 2,720 | 642 | 60.4 | 91.0 | 4.21 | 70 |
| Do | 45 | 1,400 | 3,110 | 550 | | | | |
| Do | 60 | 1,615 | 3,360 | 520 | | | | |
| Do | 90 | 1,910 | 3,235 | 450 | | | | |
| Furnace Black (Gastex) | 30 | 1,145 | 2,045 | 552 | 71.1 | 80.0 | 14.49 | 60 |
| Do | 45 | 1,390 | 2,000 | 450 | | | | |
| Do | 60 | 1,515 | 2,150 | 447 | | | | |
| Do | 90 | 1,485 | 1,900 | 377 | | | | |

[1] The resilience was measured with a Yerzley oscillograph.
[2] The heat Build up was measured with a Goodrich Flexometer.
[3] The Abrasion Loss was measured with a modified Goodyear angl. abrader.

This process is not limited to the use of liquid hydrocarbons as the source of the carbon black. Gaseous hydrocarbons can be used as well. In case the reactant hydrocarbons are gaseous the intermediate chamber would not have the function of vaporizing the hydrocarbon as in the case of liquids, but it would have the functions of preheating and precracking the hydrocarbons before they entered the reaction chamber.

Air can be supplied to either the peripheral or the axial streams in the intermediate chamber in order to generate extra heat by partial combustion of the reactant hydrocarbons. Thus, air can be supplied to the peripheral stream by using excess air in the mixture of air and fuel gas introduced tangentially into the combustion chamber, and air can be supplied to the axial stream by mixing it with the hydrocarbon in pipe 53 or by bringing it in through a separate pipe next to pipe 53 or concentric with it.

The reactant hydrocarbon retention time in the reaction chamber and the temperature within said chamber may be varied within wide limits as fully disclosed in the aforesaid copending applications of which this application is a continuation-in-part. In addition the effect of the ratio of air to gas in the tangential fuel to the reaction chamber, as well as the effect of air mixed with the reactant hydrocarbons, were likewise fully described.

Materials of construction, such as preheat chamber, intermediate and reaction chamber linings, insulation, etc., may be selected from among those items commercially available and best suited to the operating conditions as herein disclosed.

The size and particular dimensions of the apparatus as herein described are not intended to be limiting factors since the relative dimensions of the combustion chamber may be considerably varied, as well as may be the dimensions of the intermediate and reaction chambers, and yet remain within the intended scope and spirit of my invention. For chambers of larger diameters and corresponding lengths, such as might be used in commerce, the optimum sizes and relative dimensions, and the optimum size, number and arrangement of the several tangential burners would need be determined.

While a preferred form of apparatus and method of operation thereof are described in this specification, it will be obvious to one skilled in the art that there may be many possible variations of the apparatus and methods of operation as may be learned from operating experience and yet remain within my invention as herein disclosed.

What I claim is:

1. The process of producing carbon black comprising continuously introducing reactant hydrocarbon in the gaseous state into a cylindrical combustion chamber having an inlet end wall and an open outlet end, introducing into the combustion chamber a combustible mixture and burning the same to partially preheat the reactant hydrocarbon by direct heat exchange with the flame and combustion products, passing the partially heated reactant hydrocarbons, flame and combustion products into an intermediate chamber where the reactant hydrocarbon is further heated by direct heat exchange with the combustion products and flame from the combustion chamber, passing the preheated reactant hydrocarbon, flame and combustion products into a reactor chamber which is an unobstructed elongated chamber having an inlet end wall of generally circular transverse cross section and an open outlet end, introducing oxygen-containing gas into the reactor near the inlet end wall through a burner port, said burner port being positioned to direct the flow of said oxygen-containing gas in a direction tangent to the inner surface of the side wall and with the predominating component of motion perpendicular to the longitudinal axis of said cylindrical chamber, burning the mixture of reactant hydrocarbon and oxygen-containing gas to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor side wall thus forming a separating layer of said flame and combustion products between the side wall of the reactor and the reactant hydrocarbon, cooling the effluents of the reactor chamber to below the carbon black forming temperature and separating the carbon black from the products of combustion.

2. The process of producing carbon black comprising continuously introducing a normally liquid hydrocarbon into a cylindrical combustion chamber having an inlet end wall and an open outlet end, introducing into the combustion chamber a combustible mixture and burning the same to partially vaporize said liquid hydrocarbon by direct heat exchange with the flame and combustion products, passing the partially vaporized hydrocarbon, flame and combustion products into an intermediate chamber wherein said liquid hydrocarbon is fully vaporized by direct heat exchange with the combustion products and flame from the combustion chamber, passing the fully vaporized hydrocarbon, flame and combustion products into a reactor chamber which is an unobstructed elongated chamber having an open end wall of generally circular transverse cross section and an open outlet end, introducing oxygen-containing gas into the reactor chamber near the inlet end wall through a burner port, said burner port being positioned to direct the flow of oxygen-containing gas in a direction tangent to the inner surface of the side wall of the reactor and with the predominating component of motion perpendicular to the longitudinal axis of said reactor chamber, burning the mixture of vaporized hydrocarbon and oxygen-containing gas to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor side wall thus forming a separating layer of said flame and combustion products between the side wall and the reactant mixture in the reactor chamber, cooling the effluents of the reactor chamber to below the carbon black forming temperature and separating the carbon black from the products of combustion.

3. The process of producing carbon black comprising continuously spraying a normally liquid hydrocarbon into a cylindrical combustion chamber having an inlet end wall and an open outlet end at a pressure of approximately 100 pounds per square inch, introducing into the combustion chamber a combustible mixture and burning the same to at least partially vaporize said liquid hydrocarbon by direct heat exchange with the flame and combustion products in said combustion chamber, passing the partially vaporized hydrocarbon, flame and combustion products into an intermediate chamber where the hydrocarbon is fully vaporized by direct heat exchange with the combustion products and flame from the combustion chamber, passing the vaporized hydrocarbon, flame and combustion products into a reactor chamber which is an unobstructed elongated chamber having an inlet end wall of generally circular transverse cross section and an open outlet end, introducing oxygen-containing gas into the reactor chamber near the inlet end wall through a burner port, said burner port being positioned to direct the flow of said oxygen containing gas in a direction tangent to the inner surface of the side wall and with the predominating component of motion perpendicular to the longitudinal axis of said cylindrical chamber, burning the mixture of vaporized hydrocarbon and oxygen-containing gas to maintain the temperature of the reactor chamber at the carbon black forming temperature, the oxygen containing gas being introduced through said burner port at a sufficiently high velocity and in sufficient quantity to maintain by centrifugal force the flame and combustion products adjacent the whole inner surface of the chamber side wall thus forming a separating layer of said flame and combustion products between the side wall and the vaporized hydrocarbon in the reactor chamber, cooling the effluents of the reactor chamber to below the carbon black forming temperature and separating the carbon black from the products of combustion.

4. The process of producing carbon black comprising continuously introducing reactant hydrocarbon in the gaseous state into a cylindrical combustion chamber having an inlet end wall and an open outlet end, introducing into the combustion chamber a combustible mixture and burning the same to partially preheat the reactant hydrocarbon by direct heat exchange with the flame and combustion products, passing the partially heated reactant hydrocarbon, flame and combustion products into an intermediate chamber where the reactant hydrocarbon is further heated by direct heat exchange with the combustion products and flame from the combustion chamber, passing the preheated reactant hydrocarbon, flame and combustion products into a reactor chamber which is an unobstructed elongated chamber having an inlet end wall of generally circular transverse cross section and an open outlet end, introducing a combustible mixture into the reactor near the inlet end wall through a burner port, said burner port being positioned to direct the flow of said combustible mixture in a direction tangent to the inner surface of the side wall and with the predominating component of motion perpendicular to the longitudinal axis of said cylindrical chamber, burning the combustible mixture to maintain the temperature of the reactor chamber at the carbon black forming temperature, the combustible mixture being introduced through said burner port at a sufficiently high velocity and in sufficient quantity to maintain by centrifugal force the flame and combustion products adjacent the whole inner surface of the reactor side wall thus forming a separating layer of said flame and combustion products between the side wall of the reactor and the reactant hydrocarbon, cooling the effluents of the reactor chamber to below the carbon black forming temperature and separating the carbon black from the products of combustion.

5. The process of producing carbon black comprising continuously introducing a normally liquid hydrocarbon into a cylindrical combustion chamber having an inlet end wall and an open outlet end, introducing into the combustion chamber a combustible mixture and burning the same to partially vaporize said liquid hydrocarbon by direct heat exchange with the flame and combustion products, passing the partially vaporized hydrocarbon, flame and combustion products into an intermediate chamber wherein said liquid hydrocarbon is fully vaporized by direct heat exchange with the combustion products and flame from the combustion chamber, passing the fully vaporized hydrocarbon, flame and combustion products into a reactor chamber which is an unobstructed elongated chamber having an open end wall of generally circular transverse cross section and an open outlet end, introducing a combustible mixture into the reactor chamber near the inlet end wall through a burner port, said burner port being positioned to direct the flow of said combustible mixture in a direction tangent to the inner surface of the side wall of the reactor and with the predominating component of motion perpendicular to the longitudinal axis of said reactor chamber, burning the mixture of vaporized hydrocarbon and combustible mixture to maintain the temperature of the reactor chamber at the carbon black forming temperature, the combustible mixture being introduced through said burner port at a sufficiently high velocity and in sufficient quantity to maintain by centrifugal force the flame and combustion products adjacent the whole inner surface of the reactor side wall thus forming a separating layer of said flame and combustion products between the side wall and the reactant mixture in the reactor chamber, cooling the effluents of the reactor chamber to below the carbon black forming temperature and separating the carbon black from the products of combustion.

6. The process of producing carbon black comprising continuously spraying a normally liquid hydrocarbon into a cylindrical combustion chamber having an inlet end wall and an open outlet end at a pressure of approximately 100 pounds per square inch, introducing into the combustion chamber a combustible mixture and burning the same to at least partially vaporize said liquid hydrocarbon by direct heat exchange with the flame and combustion products in said combustion chamber, passing the partially vaporized hydrocarbon, flame and combustion products into an intermediate chamber where the hydrocarbon is fully vaporized by direct heat exchange with the combustion products and flame from the combustion chamber, passing the vaporized hydrocarbon, flame and combustion products into a reactor chamber which is an unobstructed elongated chamber having an inlet end wall of generally circular transverse cross section and an open outlet end, introducing a combustible mixture into the reactor chamber near the inlet end wall through a burner port, said burner port being positioned to direct the flow of said combustible mixture in a direction tangent to the inner surface of the side wall and with the predominating component of motion perpendicular to the longitudinal axis of said cylindrical chamber, burning the mixture of vaporized hydrocarbon and combustible mixture to maintain the temperature of the reactor chamber at the carbon black forming temperature, the combustible mixture being introduced through said burner port at a sufficiently high velocity and in sufficient quantity to maintain by centrifugal force the flame and combustion products adjacent the whole inner surface of the chamber side wall thus forming a separating layer of said flame and combustion products between the side wall and the vaporized hydrocarbon in the reactor chamber, cooling the effluents of the reactor chamber to below the carbon black forming temperature and separating the carbon black from the products of combustion.

7. The process of producing carbon black comprising continuously introducing reactant hydrocarbon in the gaseous state into a cylindrical combustion chamber having an inlet end wall and an open outlet end, introducing into the combustion chamber through a burner port a combustible mixture and burning the same to partially preheat the reactant hydrocarbon by direct heat exchange with the flame and combustion products, said burner port being positioned to direct the flow of said combustible mixture in a direction tangent to the inner surface of the side wall of the combustion chamber and with the predominating component of motion perpendicular to the longitudinal axis of the combustion chamber to thus give a helical motion to the flame and combustion products, moving the partially heated reactant hydrocarbon into an intermediate chamber where the reactant hydrocarbon is further preheated by direct heat exchange with the combustion products and flame from the combustion chamber, the helical force imparted to the flame and combustion products in the combustion chamber moving the preheated reactant hydrocarbon into a reactor chamber from the intermediate chamber which reactor chamber is an unobstructed elongated chamber having an inlet end wall of generally circular transverse cross section and an open outlet end, introducing oxygen-containing gas into the reactor near the inlet end wall through a second burner port, said second burner port being positioned to direct the flow of said oxygen-containing gas in a direction tangent to the inner surface of the side wall and with the predominating component of motion perpendicular to the longitudinal axis of said cylindrical chamber, burning the mixture of reactant hydrocarbon and oxygen-containing gas to maintain the temperature of the reactor chamber at the carbon black forming temperature, the oxygen-containing gas being introduced through said second burner port at a sufficiently high velocity and in sufficient quantity to maintain by centrifugal force the flame and combustion products adjacent the whole inner surface of the reactor side wall, thus forming a separating layer of said flame and combustion products between the side wall of the reactor and the reactant hydrocarbon, cooling the effluents of the reactor chamber to below the carbon black forming temperature and separating the carbon black from the products of combustion.

8. The process of producing carbon black comprising continuously introducing a normally liquid hydrocarbon into a cylindrical combustion chamber having an inlet end wall and an open outlet end, introducing into the combustion chamber through a burner port a combustible mixture and burning the same to partially vaporize said liquid hydrocarbon by direct heat exchange with the flame and combustion products, said burner port being positioned to direct the flow of said combustible mixture in a direction tangent to the inner surface of the side wall of the combustion chamber and with the predominating component of motion perpendicular to the longitudinal axis of the combustion chamber to thus give a helical motion to the flame and combustion products, moving the partially vaporized hydrocarbon into an intermediate chamber where the partially vaporized hydrocarbon is fully vaporized by direct heat exchange with the combustion products and flame from the combustion chamber, the helical force imparted to the flame and combustion products moving the vaporized hydrocarbon into a reactor chamber which is an unobstructed elongated chamber having an inlet end wall of generally circular transverse cross section and an open outlet end, introducing oxygen-containing gas into the reactor near the inlet end wall through a second burner port, said second burner port being positioned to direct the flow of said oxygen-containing gas in a direction tangent to the inner surface of the side wall and with the predominating component of motion perpendicular to the longitudinal axis of said cylindrical chamber, burning the mixture of vaporized hydrocarbon and oxygen-containing gas to maintain the temperature of the reactor chamber at the carbon black forming temperature, the oxygen-containing gas being introduced through said second burner port at a sufficiently high velocity and in sufficient quantity to maintain by centrifugal force the flame and combustion products adjacent the whole inner surface of the reactor side wall thus forming a separating layer of said flame and combustion products between the side wall of the reactor and the vaporized hydrocarbon, cooling the effluents of the reactor chamber to below the carbon black forming temperature and separating the carbon black from the products of combustion.

9. The process of producing carbon black comprising continuously spraying a normally liquid hydrocarbon into a cylindrical combustion chamber having an inlet end wall and an open outlet end at a pressure of approximately 100 pounds per square inch, introducing into the combustion chamber through a burner port a combustible mixture and burning the same to partially vaporize said liquid hydrocarbon by direct heat exchange with the flame and combustion products, said burner port being positioned to direct the flow of said combustible mixture in a direction tangent to the inner surface of the side wall of the combustion chamber and with the predominating component of motion perpendicular to the longitudinal axis of the combustion chamber to thus give a helical motion to the flame and combustion products, moving the partially vaporized hydrocarbon into an intermediate chamber where the partially vaporized hydrocarbon is fully vaporized by direct heat exchange with the combustion products and flame from the combustion chamber, the helical force imparted to the flame and combustion products moving the vaporized hydrocarbon into a reactor chamber which is an unobstructed elongated chamber having an inlet end wall of generally circular transverse cross section and an open outlet end, introducing oxygen-containing gas into the reactor near the inlet end wall through a second burner port, said second burner port being positioned to direct the flow of said oxygen-containing gas in a direction tangent to the inner surface of the side wall and with the predominating component of motion perpendicular to the longitudinal axis of said cylindrical chamber, burning the mixture of vaporized hydrocarbon and oxygen-containing gas to maintain the temperature of the reactor chamber at the carbon black forming temperature, the oxygen-containing gas being introduced through said second burner port at a sufficiently high velocity and in sufficient quantity to maintain by centrifugal force the flame and combustion products adjacent the whole inner surface of the reactor side wall thus forming a separating layer of said flame and combustion products between the side wall of the reactor and the vaporized hydrocarbon, cooling the effluents of the reactor chamber to below the carbon black forming temperature and separating the carbon black from the products of combustion.

10. An apparatus for making carbon black comprising a cylindrical combustion chamber having the side wall thereof insulated, an insulated inlet end wall and an insulated outlet end wall, the inlet end carrying an inlet tube and the outlet end carrying an outlet tube, the insulated side wall carrying a burner opening intermediate the inlet end and the outlet end of said cylindrical combustion chamber, said burner opening being supplied with an inlet pipe so positioned within said opening in the insulated side wall as to direct gases flowing therethrough in a direction tangent to the inner surface of said side wall and essentially perpendicular to the longitudinal axis of said cylindrical combustion chamber; a cylindrical intermediate chamber of relatively small diameter and having the side wall thereof insulated, an open inlet end connecting to the combustion chamber and an open outlet end connecting to a reactor chamber, said reactor chamber being cylindrical and having the side wall thereof insulated, an insulated inlet end wall and an open outlet end, the inlet end wall carrying an inlet tube and the insulated side wall carrying a second opening intermediate the inlet and outlet ends of said cylindrical reaction chamber, said second opening being supplied with an inlet pipe so positioned within said insulated side wall as to direct gases flowing therethrough in a direction tangent to the inner surface of said side wall and essentially perpendicular to the longitudinal axis of the cylindrical reaction chamber; and the longitudinal axes of the cylindrical, combustion, intermediate and reactor chambers being essentially in line.

11. An apparatus for making carbon black comprising a cylindrical combustion chamber having the side wall thereof insulated, an insulated inlet end wall and an insulated outlet end wall, the inlet end carrying an inlet tube and the outlet end carrying an outlet tube, the insulated side wall carrying a burner opening intermediate the inlet end and the outlet end of said cylindrical combustion chamber, said burner opening being supplied with an inlet pipe so positioned within said opening in the insulated side wall as to direct gases flowing therethrough in a direction tangent to the inner surface of said side wall and essentially perpendicular to the longitudinal axis of said cylindrical combustion chamber; a cylindrical intermediate chamber of relatively small diameter and having the side wall thereof insulated, an open inlet end connecting to the combustion chamber and an open outlet end connecting to a reactor chamber, said reactor chamber being cylindrical and having the side wall thereof insulated, an insulated inlet end wall and an open outlet end, the inlet end wall carrying an inlet tube and the insulated side wall carrying a second opening intermediate the inlet and outlet ends of said cylindrical reaction chamber, said second opening being supplied with an inlet pipe so positioned within said insulated side wall as to direct gases flowing therethrough in a direction tangent to the inner surface of said side wall and essentially perpendicular to the longitudinal axis of the cylindrical reaction chamber, the longitudinal axes of the cylindrical, combustion, intermediate and reactor chambers being essentially in line, and the ratio of the diameter of the length of the cylindrical combustion chamber being relatively large as compared to those ratios for the intermediate and reactor chambers.

12. The process of producing carbon black comprising continuously introducing reactant hydrocarbon into a cylindrical combustion chamber having an inlet end wall and an open outlet end, introducing into the combustion chamber a combustible mixture and burning the same to partially preheat the reactant hydrocarbon by direct heat exchange with the flame and combustion products, passing the partially heated reactant hydrocarbons, flame and combustion products into an intermediate chamber where the reactant hydrocarbon is further heated by direct heat exchange with the combustion products and flame from the combustion chamber, passing the preheated reactant hydrocarbon, flame and combustion products into a reactor chamber which is an unobstructed elongated chamber having an inlet end wall of generally circular transverse cross section and an open outlet end, introducing oxygen-containing gas into the reactor near the inlet end wall through a burner port, said burner port being positioned to direct the flow of said oxygen-containing gas in a direction tangent to the inner surface of the side wall and with the predominating component of motion perpendicular to the longitudinal axis of said cylindrical chamber, burning the mixture of reactant hydrocarbon and oxygen-containing gas to maintain the temperature of the reactor chamber at the carbon black forming temperature, the oxygen-containing gas being introduced through said burner port at a sufficiently high velocity and in sufficient quantity to maintain by centrifugal force the flame and combustion products adjacent the whole inner surface of the reactor side wall thus forming a separating layer of said flame and combustion products between the side wall of the reactor and the reactant hydrocarbon, cooling the effluents of the reactor chamber to below the carbon black forming temperature and separating the carbon black from the products of combustion.

13. The process of producing carbon black comprising continuously introducing reacting hydrocarbon into a cylindrical combustion chamber having an inlet end wall and an open outlet end, introducing into the combustion chamber a combustible mixture and burning the same to partially preheat the reactant hydrocarbon by direct heat exchange with the flame and combustion products, passing the partially heated reactant hydrocarbon, flame and combustion products into an intermediate chamber where the reactant hydrocarbon is further heated by direct heat exchange with the combustion products and flame from the combustion chamber, passing the preheated reactant hydrocarbon, flame and combustion products into a reactor chamber which is an unobstructed elongated chamber having an inlet end wall of generally circular transverse cross section and an open outlet end, introducing a combustible mixture into the reactor near the inlet end wall through a burner port, said burner port being positioned to direct the flow of said combustible mixture in a direction tangent to the inner surface of the side wall and with the predominating component of motion perpendicular to the longitudinal axis of said cylindrical chamber, burning the combustible mixture to maintain the temperature of the reactor chamber at the carbon black forming temperature, the combustible mixture being introduced through said burner port at a sufficiently high velocity and in sufficient quantity to maintain by centrifugal force the flame and combustion products adjacent the whole inner surface of the reactor side wall thus forming a separating layer of said flame and combustion products between the side wall of the reactor and the reactant hydrocarbon, cooling the effluents of the reactor chamber to below the carbon black forming temperature and seperating the carbon black from the products of combustion.

14. The process of producing carbon black comprising continuously introducing reactant hydrocarbon into a cylindrical combustion chamber having an inlet end wall and an open outlet end, introducing into the combustion chamber through a burner port a combustible mixture and burning the same to partially preheat the reactant hydrocarbon by direct heat exchange with the flame and combustion products, said burner port being positioned to direct the flow of said combustible mixture in a direction tangent to the inner surface of the side wall of the combustion chamber and with the predominating component of motion perpendicular to the longitudinal axis of the combustion chamber to thus give a helical motion to the flame and combustion products, moving the partially heated reactant hydrocarbon into an intermediate chamber where the reactant hydrocarbon is further preheated by direct heat exchange with the combustion products and flame from the combustion chamber, the helical force imparted to the flame and combustion products in the combustion chamber moving the preheated reactant hydrocarbon into a reactor chamber from the intermediate chamber which reactor chamber is an unobstructed elongated chamber having an inlet end wall of generally circular transverse cross section and an open outlet end, introducing oxygen-containing gas into the reactor near the inlet end wall through a second burner port, said second burner port being positioned to direct the flow of said oxygen-containing gas in a direction tangent to the inner surface of the side wall and with the predominating component of motion perpendicular to the longitudinal axis of said cylindrical chamber, burning the mixture of reactant hydrocarbon and oxygen-containing gas to maintain the temperature of the reactor chamber at the carbon black forming temperature, the oxygen-containing gas being introduced through said second burner port at a sufficiently high velocity and in sufficient quantity to maintain by centrifugal force the flame and combustion products adjacent the whole inner surface of the reactor side wall, thus forming a separating layer of said flame and combustion products between the side wall of the reactor and the reactant hydrocarbon, cooling the effluents of the reactor chamber to below the carbon black forming temperature and separating the carbon black from the products of combustion.

JOSEPH C. KREJCI.

REFERENCES CITED

The following references are of record in the file of this patent:

UNITED STATES PATENTS

| Number | Name | Date |
| --- | --- | --- |
| 2,153,951 | Barber | Apr. 11, 1939 |
| 2,144,971 | Heller | Jan. 24, 1939 |
| 2,292,355 | Ayers | Aug. 11, 1942 |